June 30, 1931.  R. E. GARRETT  1,811,925
COATED FIBROUS MATERIAL
Filed March 9, 1927
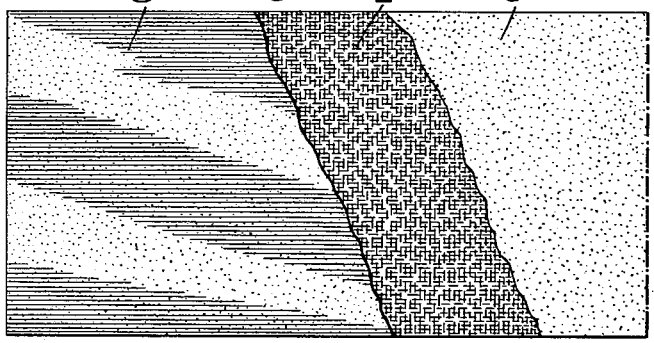
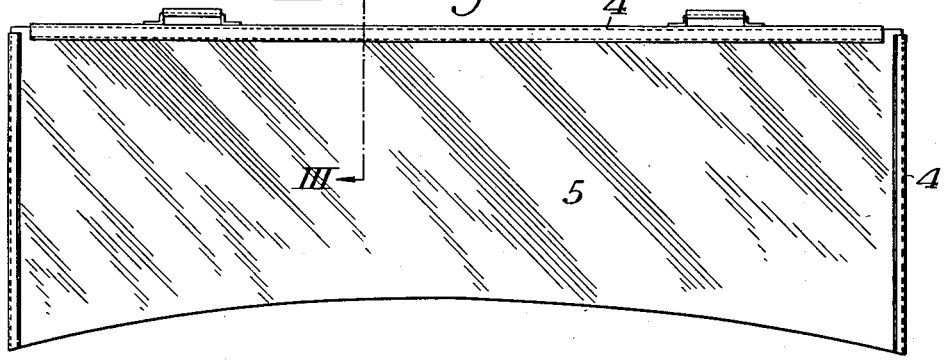
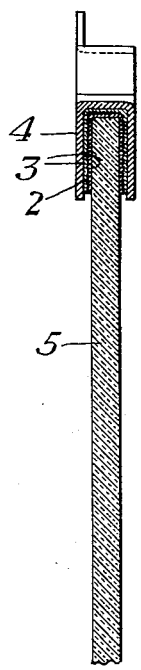
INVENTOR Patented June 30, 1931

1,811,925

UNITED STATES PATENT OFFICE

RAYMOND E. GARRETT, OF LANCASTER, PENNSYLVANIA, ASSIGNOR TO ARMSTRONG CORK COMPANY, OF PITTSBURGH, PENNSYLVANIA, A CORPORATION OF PENNSYLVANIA

COATED FIBROUS MATERIAL

Application filed March 9, 1927. Serial No. 173,927.

This invention relates to coated fibrous materials and is particularly valuable for the production of channel filler strips used in the mounting of windows.

In automobile body construction and also in the fitting of plate glass windows, it is highly desirable to provide a cushioning means between the glass and the supporting frame to provide a waterproof joint, simplify installation and reduce the transmission of shocks to the glass as well as to eliminate squeaks and rattles.

I provide a sheet of fibrous material having a composition of rubber and granulated cork applied to both sides thereof. This sheet of material may be cut to strips of the desired width which embrace the edges of the glass and insure a proper fit in the window frame. Preferably the fibrous material is an open weave fabric to permit the suitable bonding of the coating material, although other fibrous materials such as strong paper may be employed.

It is preferred to leave the mixture generally unvulcanized, as this eliminates cracking and makes the material more adhesive to the glass.

The surfaces, however, are treated by a light application of a liquid, of which starch is the main ingredient, in order to prevent plies of material adhering when material is in transit.

The material is preferably stripped to necessary width for various types of construction and the cut edges are dyed black. This allows the glass assembly to be made without any trim cut or coloring of edges being necessary to make a finished job.

In the accompanying drawings illustrating my improved product and one application thereof:

Figure 1 is a top plan view partly broken away of a coated fabric construction according to my invention;

Figure 2 is an elevation of an automobile windshield having my invention applied thereto, and Figure 3 is a section to enlarged scale taken on the line III—III of Figure 2.

In the illustrated embodiment of the invention there is shown a layer of open weave fabric 2 having a coating 3 of rubber and granulated cork on either face thereof. Preferably the fabric is a cotton fabric such as duck, sheeting, drill or Osnaburg, the latter material being preferred due to its open weave structure to which the rubber cork composition may be more firmly keyed.

The preferred formula for 100 pounds of the rubber cork composition is as follows:

24 pounds reclaim rubber, 5 pounds resinous softener, 8 pounds hard hydrocarbon, 8 pounds sulphonated vegetable oil, 2 pounds gas black, 8 pounds ground clay, 45 pounds granulated cork.

The above material is first pre-mixed and the work is then completed on a standard two roll rubber mill.

The fabric is passed through a three roll calender and the above described rubber cork composition is applied to one side. The material is then passed through the calender a second time and the rubber cork compound is applied to the other side. The material is then passed over a standard sizing machine where the starch compound is applied.

The resulting material is very resilient and has a high coefficient of friction so that it is of extreme value in the mounting of glass windows. The surface treating does not effect the resiliency of the product, which being unvulcanized, maintains its flexibility over a long period and shows no tendency to crack. The surface treating, however, does make the material more convenient to handle since adjacent sheets do not adhere. The use of a double coated material is of particular value in that the fabric base is protected from rot and also since the outer layer of rubber cork composition prevents seepage of water between the fabric and the channel or other window mounting.

Referring to Figures 2 and 3, there is shown a windshield consisting of a metal channel 4 and having a sheet of glass 5 mounted therein. The use of the coated fabric is best illustrated in Figure 3.

The term "windshield" as used herein includes windows and the like wherein it is desired to mount a sheet of glass in a frame or channel.

Claims directed particularly to the windshield construction are presented in a divisional application, Serial Number 210,748, filed August 5, 1927.

I have illustrated and described a preferred embodiment of the invention, but it will be understood that it is not limited to such form, since it may be otherwise embodied within the scope of the following claims.

I claim:

1. A sheet of fibrous material having applied thereto a homogeneous coating mixture including unvulcanized rubber and granulated cork, the amount of granulated cork in the mixture predominating over the amount of rubber present therein, the rubber being present in the mixture to the extent of about 24% by weight.

2. A sheet of fibrous material having applied thereto a homogeneous coating mixture including unvulcanized rubber and granulated cork, the amount of granulated cork in the mixture predominating over the amount of rubber present therein, the rubber being present in the mixture to the extent of about 24% by weight, the amount of cork in the mixture amounting to about 45% of the mixture by weight.

In testimony whereof I have hereunto set my hand.

R. E. GARRETT.